(12) United States Patent
Lawson

(10) Patent No.: US 6,174,640 B1
(45) Date of Patent: Jan. 16, 2001

(54) EPOXY BASED LIQUID TONER FORMULATIONS

(75) Inventor: Terence Michael Lawson, Adelaide (AU)

(73) Assignee: Research Laboratories of Australia PTY Ltd., Eastwood (AU)

( * ) Notice: Under 35 U.S.C. 154(b), the term of this patent shall be extended for 0 days.

(21) Appl. No.: 09/362,308

(22) Filed: Jul. 28, 1999

(30) Foreign Application Priority Data

Aug. 7, 1998 (AU) .................................................... PP5160

(51) Int. Cl.$^7$ ....................................................... G03G 9/13
(52) U.S. Cl. .............................................. 430/115; 430/137
(58) Field of Search ...................................... 430/115, 137

(56) References Cited

U.S. PATENT DOCUMENTS 5,049,468 * 9/1991 Kato et al. ............................ 430/114
5,356,748 * 10/1994 Horie et al. ........................... 430/114

* cited by examiner

Primary Examiner—John Goodrow
(74) Attorney, Agent, or Firm—Evenson, McKeown, Edwards & Lenahan, P.L.L.C.

(57) ABSTRACT

A polymer suitable for the preparation of liquid toners for developing electrostatic images and liquid toners incorporating such a polymer. The polymer is a reaction product of an epoxy resin and carrier soluble nitrogen bearing polymeric compound. The epoxy resin may be a reaction product of bisphenol A and epichlorhydrin and the carrier soluble nitrogen bearing polymeric compound may be an alkylated polyvinylpyrrolidone.

6 Claims, No Drawings

EPOXY BASED LIQUID TONER FORMULATIONS

BACKGROUND OF THE INVENTION

This invention relates to a polymer suitable for the preparation of liquid toners for developing electrostatic images and liquid toners incorporating such a polymer for developing electrostatic images.

A liquid toner formulation for the present invention generally comprises chemically modified polymer particles which may contain pigments or dyes as colorants, dispersed in a liquid carrier having an electrical resistance of at least $10^9$ ohm-cm and having a dielectric constant of not more than 3.5.

In general, such a liquid toner for developing electrostatic images is prepared by dispersing an inorganic or organic colorant such as iron oxide, carbon black, nigrosine, phthalocyanine blue, benzidine yellow, quinacridone pink and the like into a liquid vehicle which may contain dissolved or dispersed therein synthetic or naturally occurring polymers such as acrylics and their copolymers, alkyds, rosins, rosin esters, epoxies, polyvinyl acetate, styrene-butadiene, cyclised rubber, ethylene vinyl acetate copolymers, polyethylene, etc. Additionally, to impart or enhance an electrostatic charge on such dispersed particles, additives known as charge directors or charge control agents may be included. Such materials can be metallic soaps, fatty acids, lecithin, organic phosphorus compounds, succinimides, sulphosuccinates etc.

The object of the use of such liquid toners is to produce a visible image as an outcome of an electrostatic or electrophotographic imaging process. In some cases the final visual image needs to have certain mechanical properties such as high abrasion resistance. For this reason the solid thermoplastic epoxy polymers have been used in historical liquid toners. For these applications an epoxy resin is usually defined as the reaction product of bisphenol A and epichlorhydrin. Such compounds are often called diglycidyl ethers of bisphenol A, abbreviated to DGEBA. The structure of resins of this type is:

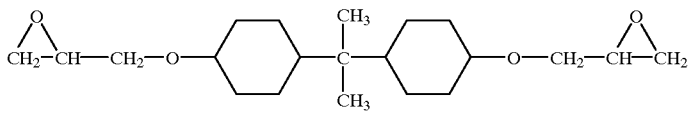

These materials have been shown to be useful in liquid toners because of their ease of comminution in non-solvents for epoxies, such as aliphatic hydrocarbons by either grinding or emulsification; their intrinsic positive polarity in such liquid carriers; and for the quality of images they produce regarding robustness, either as the unreacted thermoplastic polymer or after post imaging reaction using suitable crosslinking agents.

However, extensive work with these particular materials over the years has revealed certain shortcomings in the quality of liquid toners incorporating these polymers. In particular, stability of the dispersions containing these has been only fair due to the reactivity of DGEBA resins. Typical failure modes of these toners have been agglomeration of the dispersed epoxy, reduced redispersibility and loss of particle charge.

In order to overcome the limitations discovered, investigations were carried out to determine the probable source of this reactivity and discover a means of minimising it.

Epoxy resins, and in particular DGEBA as previously described, have long featured in liquid toner patents, for example U.S. Pat. No. 5,609,979 to Lawson. Advantage has been taken of their thermoplasticity for image fusing purposes, adhesiveness and high glass transition points for ease of particle size reduction. What has not been addressed before has been the instability of such materials in the presence of commonly used charge control agents having a slightly acidic nature.

It is well known in the surface coatings industry to modify epoxy resins by reacting with, for example, silicone resins to produce a silicone epoxy condensate or vegetable oils to produce epoxy esters. Such a silicone reaction is described by both Dow Corning and Shell Chemical in technical bulletins outlining uses of their products. In this case the reaction occurs between the hydroxyl groups pendant to the structure of the DGEBA molecule and the hydroxyl groups of the reacting silicone molecule. In the case of vegetable oils, it is the carboxylic acid group of the oil which reacts with the hydroxyl group of the DGEBA. The epoxy group terminal to DGEBA structure is not opened or altered by these reactions.

We have found in addition, and unexpectedly, that another class of materials will react with the epoxy resin in a similar way, i.e. at the hydroxyl groups, and result in a compound with very suitable liquid toner polymer attributes.

Thus an object of the invention is to provide a liquid toner containing a modified epoxy resin as the primary image forming polymer suitable for developing electrostatic images.

A further object of the present invention is to provide a liquid toner composition containing a modified epoxy resin having reduced reactivity towards metallic soaps or other toner constituents with an acidic nature.

Another object of the present invention is to provide a liquid toner composition having a modified epoxy polymer which retains its capability of crosslinking via the epoxide group contained within the DGEBA molecule.

SUMMARY OF THE INVENTION

In one form therefore the invention is said to reside in a polymer suitable for the preparation of liquid toners for developing electrostatic images, the polymer being a reaction product of an epoxy resin and a nitrogen bearing polymeric compound.

In an alternative form the invention is said to reside in a liquid toner for developing electrostatic images, the toner containing a colorant and a modified epoxy polymer dispersed in an electrically insulating fluid carrier, the polymer being a reaction product of an epoxy resin and a nitrogen bearing polymeric compound.

Hence it will be seen that the present invention provides a liquid electrophotographic toner composition in which the epoxy polymer, preferably DGEBA is dispersed in the carrier liquid has been partially reacted with a unique carrier soluble nitrogen bearing polymeric compound to produce a new stabilised polymer. This product is still capable of crosslinking via an epoxide ring, but now has reduced reactivity which limits further reaction with other toner constituents, such as metallic soap control agents. The ability to achieve a small particle size and generate particle charge are unaffected by this modification and toner dispersion stability is improved. An additional benefit is that the reaction product has pigment dispersing qualities better than the original DGEBA polymer when used in a plastics fabricator, such as an extruder.

The presently claimed invention thus provides an improved electrophotographic liquid toner composition containing a colorant and a new class of modified epoxy polymer dispersed in an electrically insulating fluid.

Preferably the epoxy resin is a reaction product of bisphenol A and epichlorhydrin. Such compounds are often called diglycidyl ethers of bisphenol A, abbreviated to DGEBA.

The nitrogen bearing polymeric compound is preferably an alkylated polyvinylpyrrolidone.

The electrically insulating fluid carrier may be selected from paraffinic, isoparaffinic or cycloparaffinic hydrocarbons, linear or cyclic polydimethylsiloxanes, fluorinated hydrocarbons including fluorinated ethers and refined vegetable oils and their esters.

The colourant may be selected from any of those commercially available inorganic pigments such as carbon blacks, silica, alumina, titanium dioxide, magnetic iron oxide, or organic pigments such as phthalocyanine blue, alkali and reflex blue, phthalocyanine green, diarylide yellow, arylamide yellow, azo and diazo yellow, azo red, rubine toner, quinacridone red, basic dye complexes, lake red, or fluorescent pigments and dyestuffs such as basic dyes and spirit soluble dyes.

The toner formulation according to this invention may include other components as are known in the art including preservatives, viscosity modifiers, charge control agents and binders.

DETAILED DESCRIPTION OF THE INVENTION

Alkylated polyvinylpyrrolidones are uniquely provided commercially under the trade name of Antaron (Ganex) by GAF/ISP Chemicals. Of the range manufactured, two of the Antarons are very suitable for this application, Antaron V216 and Antaron V220. The preferred of these, Antaron V220 is a copolymer of polyvinylpyrrolidone and eicosene. Properties of these materials are given Table 1 below.

TABLE 1

Properties of Antaron V220 and V216

| Antaron Polymer | V220 | V216 |
|---|---|---|
| Physical form (25° C.) | Waxy solid | Viscous liquid |
| Average molecular weight | 8,600 | 7,300 |
| Melting point (° C.) | 32–36 | N/A |

It has been found that when either of these compounds is mixed with a DGEBA resin and heated, a reaction occurs during which water is evolved and a visible change from clear yellow to opaque brown occurs. It can be shown from infra red analysis that the hydroxyl groups of the DGEBA resin are reduced by this reaction.

Evidence that the condensate resulting from the reaction between the epoxy and the polyvinylpyrrolidone/eicosene copolymer does indeed form a thermoplastic resin and not a cured or epoxide crosslinked thermoset resin can be determined by analysing the infrared spectra of the condensate and the infrared spectra of the other compounds.

In curing processes the terminal epoxy groups disappear and can be monitored through the reduction in intensity of the 917 $cm^{-1}$ band. The epoxide group has a strong absorption between 550 and 575 $cm^{-1}$ due to C-O-C in plane and ring bending vibrations.

However, Antaron V220 possesses no substantial absorption bands in these two regions.

The intensity of the 917 $cm^{-1}$ band for Araldite GT 6084 and the condensate product of Araldite GT 6084 and Antaron V220, reveals that there has been no reduction in intensity of this band, indicating that the epoxide groups are still intact. Further support of this can be seen from the 555 $cm^{-1}$ band, which again indicates the epoxide group has remained intact.

It has been previously stated that the reaction of the copolymer with the epoxy occurs via the hydroxyl groups of the epoxy. This argument can be supported by the reduction in intensity between the Araldite GT 6084 and the condensate product of Araldite GT 6084 and Antaron V220 at the 3450 $cm^{-1}$ band (attributed to O-H stretching vibrations). This would imply that less hydroxyl groups are proportionally present in the condensate material than were originally present in the pure epoxy.

The reaction product, when cool, retains the friability of the original DGEBA resin and can be ground in a liquid toner composition by any generally used technique for liquid toner manufacture e.g. ball milling, attritor or bead mill.

Additionally it can be shown that the reaction product retains its thermoplasticity, indicating that the epoxy groups have not entered into any reaction and crosslinking between molecules of the DGEBA has not occurred. This can be demonstrated by thermomechanical analysis (TMA) of the DGEBA before and after such a reaction.

It can be determined by evaluating TMA curves for the unreacted epoxy and the reacted epoxy that the reacted epoxy is still thermoplastic. This would indicate that epoxide groups have not entered into any reaction and crosslinking between molecules of the DGEBA has not occurred. In fact, the thermal properties of the unreacted and reacted epoxy are almost identical, as can be seen in Table 2 below.

TABLE 2

Thermomechanical analysis of the DGEBA before and after reaction.

| Sample | Estimated Onset of Softening Point (° C.) | Estimated Onset of Melting Point (° C.) |
|---|---|---|
| Unreacted Epoxy | 62 | 99 |
| Reacted Epoxy (Condensate #1) | 63 | 101 |

The process of the present invention for the preparation of the modified epoxy resin and the subsequent liquid toner according to a preferred embodiment of the invention will now be explained, without any intention of being limited thereby.

In the first step of the process of the present invention, a DGEBA epoxy resin is melted in a suitable vessel and to it the alkylated polyvinylpyrrolidone (Antaron) copolymer is added with stirring. The temperature of this mix can range from 100° C. to 150° C. depending on the DGEBA resin used. The molten mixture is further heated with stirring and continued until no further visible change is noticed in the mixture. The initial transparent yellow of the mix becomes opaque with heating and the final reaction product is a light tan opaque, brittle solid. Proportion of Antaron to DGEBA can range from as low as 1% to 50% of the total mixture. It has also been found that the Buss kneader can be used to produce the condensate while incorporating the pigment into a suitably dispersed form. In this case, the finely divided raw materials are introduced into the kneader operating at 100–150° C. The extrudate comprises the reaction product with pigment dispersed therein.

EXAMPLE 1

Condensate #1

| Araldite 6084 | 200 gm |
| Antaron V220 | 60 gm |

The above materials are admixed cold, in a stainless steel beaker, then heated to 150° C., approximately 50° C. above the melting point of the DGEBA resin. At this temperature, evolution of water vapour is readily seen and the reactants take on a milky appearance. When cooled to room temperature, an opaque, light tan friable product is obtained. This condensate product #1 from Example 1 can be used to prepare a liquid toner suitable for producing abrasion resistant images on a paper substrate after pressure transfer from a suitable electrostatic image supporting dielectric. Such toner is shown in Example 2.

EXAMPLE 2

| Condensate #1 | 100 gms |
| Irgalite blue LGLD | 10 gm |
| Pentalyn H | 25 gm |
| FOA-2 | 25 gm |
| Nuxtra 6% Zirconium octoate | 10 gm |
| Isopar L | 500 gm |

The above materials were milled together in a ceramic jar containing a load of alumina balls for 4 days to produce a positively charged blue liquid toner. Particle size was determined with a Malvern Mastersizer and is shown in Table 3.

EXAMPLE 3

Condensate #2

| Epikote 1007 | 100 gms |
| Antaron V220 | 50 gms |

The procedure outlined for Condensate #1 was repeated for the Condensate #2 reactants. The condensate product #2 from Example 3 were then used to prepare a liquid toner suitable for producing heat fusible, abrasion resistant images on a metal substrate after electrostatic transfer from a photoconductor. Such toner is shown in Example 4.

EXAMPLE 4

| Condensate #2 | 100 gms |
| Irgalite blue LGLD | 10 gms |
| FOA-2 | 25 gms |
| 4% Manganese naphthenate | 5 gms |
| Isopar L | 500 gms |

The above materials are milled together in a ceramic jar containing a load of spherical alumina grinding media for 4 days to produce a positively charged blue liquid toner with a particle size of approximately 2 microns.

EXAMPLE 5

Condensate #3

| Epikote 1001 | 100 gms |
| Antaron V216 | 50 gms |

The procedure outlined for Condensate #1 was repeated for the Condensate #3 reactants.

The condensate product #3 from Example 5 was used to prepare a pigmented masterbatch by use of a plastics extruder such as the Buss TCS30 laboratory extruder. In this device, which is a single reciprocating screw kneader, a 10% by weight pigment in Condensate #3 was prepared by processing the dry mixture at 100° C. A well dispersed extrusion was formed which was cooled and crushed easily to be subsequently used to prepare a liquid toner (Example 6) suitable for producing a low melting point abrasion resistant images on a polyester substrate after electrostatic transfer from a photoconductor. After fusion, such images were transparent to transmitted light by virtue of the low film thickness, exhibited excellent pigment dispersion in the epoxy condensate and smoothness of the image surface. This smoothness is attributable to the low melt viscosity of this condensate.

EXAMPLE 6

| Condensate #3 | 450 gm |
| Irgalite blue LGLD | 50 gm |

Processed at 100° C. in Buss TCS30 extruder to form Masterbatch #1

| Masterbatch #1 | 100 gm |
| FOA-2 | 25 gms |
| Nuxtra 6% zirconium octoate | 10 gms |
| Isopar L | 500 gms |

Ball mill 4 days in a ceramic jar containing spherical alumina grinding media.

EXAMPLE 7

| | |
|---|---|
| Condensate #2 | 100 gms |
| Irgalite blue LGLD | 10 gms |
| HT2833 | 5 gms |
| FOA-2 | 25 gms |
| 4% Manganese naphthenate | 5 gms |
| Isopar L | 500 gms |

Ball mill 4 days in a ceramic jar containing spherical alumina grinding media.

Images produces by the above liquid toner on a photoconductor can be transferred via a suitable intermediate transfer member to a metal offset printing plate. These images when heated to 150° C. for 15 minutes show greater solvent resistant properties than images from Example 4 above after treatment in like manner. This solvent resistance is an expectation of a crosslinked epoxy resin property.

COMPARATIVE EXAMPLE 8

| | |
|---|---|
| Araldite 6084 | 100 gm |
| Irgalite blue LGLD | 10 gm |
| Pentalyn H | 25 gm |
| FOA-2 | 25 gm |
| Nuxtra 6% Zirconium octoate | 10 gm |
| Isopar L | 500 gm |

Ball mill 4 days in a ceramic jar containing spherical alumina grinding media.

The above liquid toner produces good quality heat fusible cyan images on a variety of substrates after electrostatic transfer from either a photoconductive or dielectric recording member. However, after storage at an ambient temperature of 25° C. for 3 months, this comparative toner was found to produce a compacted sediment which was difficult to redisperse. The toner as described in Example 6, stored under similar conditions, does not exhibit this problem. Although sedimentation occurs, it is less than the Comparative Example 8 and redispersion of this sediment is much easier than Comparative Example 8.

In addition, particle size measurements were determined. Results of this toner and those of Example 1 are shown in Table 3.

TABLE 3

Particle size distribution.

| Toner Sample | Mean Diameters (mm) D(v,0.5) | D(4,3) |
|---|---|---|
| Example 8 | 1.64 | 1.71 |
| Example 2 | 0.63 | 0.78 |

The above particle size results were characterised using a Malvern Mastersizer S. D(4,3) indicates the equivalent spherical volume diameter mean. This value is biased toward larger particles since volume is a function of the cube of the particle radius. D(v,0.5) indicates the volume 50% value of the distribution. This differs from D(4,3) if the volume distribution is skewed.

As can be seen in Table 3, the toner formulation employing the modified epoxy resin (Condensate #1 Example 2) as the marking particle, exhibits a much narrower particle size distribution with significantly lower mean diameters than that of the Comparative Example 8.

Materials

Araldite 6084: Ciba, Basel Switzerland

Epikote 1001, 1007: Shell Chemicals, UK

Irgalite blue LGLD: Ciba, Basel Switzerland

FOA2: DuPont, Wilmington, Del., U.S.A.

Pentalyn H: Hercules Inc, Wilmington, Del., U.S.A.

Nuxtra 6% Zirconium Octoate: Creanova, New Jersey, U.S.A.

Manganese naphthenate: Huls America, New Jersey, U.S.A.

Antaron V216, V220: GAF/ISP Chemicals, New Jersey, U.S.A.

HT2833: Ciba, Basel Switzerland

Isopar L: Exxon Chemical Co., Texas, U.S.A.

I claim:

1. A liquid toner for developing electrostatic images, comprising, a colorant; and a modified epoxy polymer dispersed in an electrically insulating fluid carrier, wherein the modified epoxy polymer is a reaction product of an epoxy resin and a nitrogen-bearing polymeric compound, and wherein the epoxy resin is a reaction product of bisphenol A and epichlorhydrin.

2. A liquid toner as in claim 1 wherein the nitrogen bearing polymeric compound is an alkylated polyvinylpyrrolidone.

3. A liquid toner as in claim 1 wherein the electrically insulating fluid carrier is selected from paraffinic, isoparaffinic or cycloparaffinic hydrocarbons, linear or cyclic polydimethylsiloxanes, fluorinated hydrocarbons including fluorinated ethers and refined vegetable oils and their esters.

4. A liquid toner as in claim 1 wherein the colourant is selected from inorganic pigments such as carbon blacks, silica, alumina, titanium dioxide, magnetic iron oxide, or organic pigments such as phthalocyanine blue, alkali and reflex blue, phthalocyanine green, diarylide yellow, arylamide yellow, azo and diazo yellow, azo red, rubine toner, quinacridone red, basic dye complexes, lake red, or fluorescent pigments and dyestuffs such as basic dyes and spirit soluble dyes.

5. A liquid toner for developing electrostatic images, comprising:

a colorant and a modified epoxy polymer dispersed in an electrically insulating fluid carrier, wherein the modified epoxy polymer is a reaction product of a diglycidyl ether of bisphenol A and alkylated polvinylpyrrolidone.

6. A method of preparing liquid toners for developing electrostatic images comprising reacting an epoxy resin with a carrier-soluble, nitrogen-bearing polymeric compound, wherein the epoxy resin is a reaction product of bisphenol A and epichlorhydrin.

* * * * *